Figure 20:
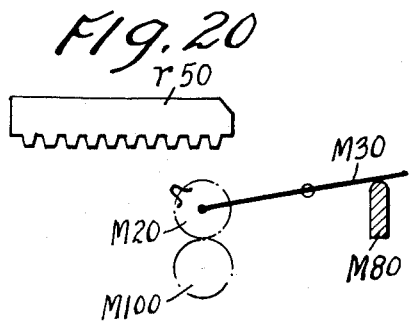

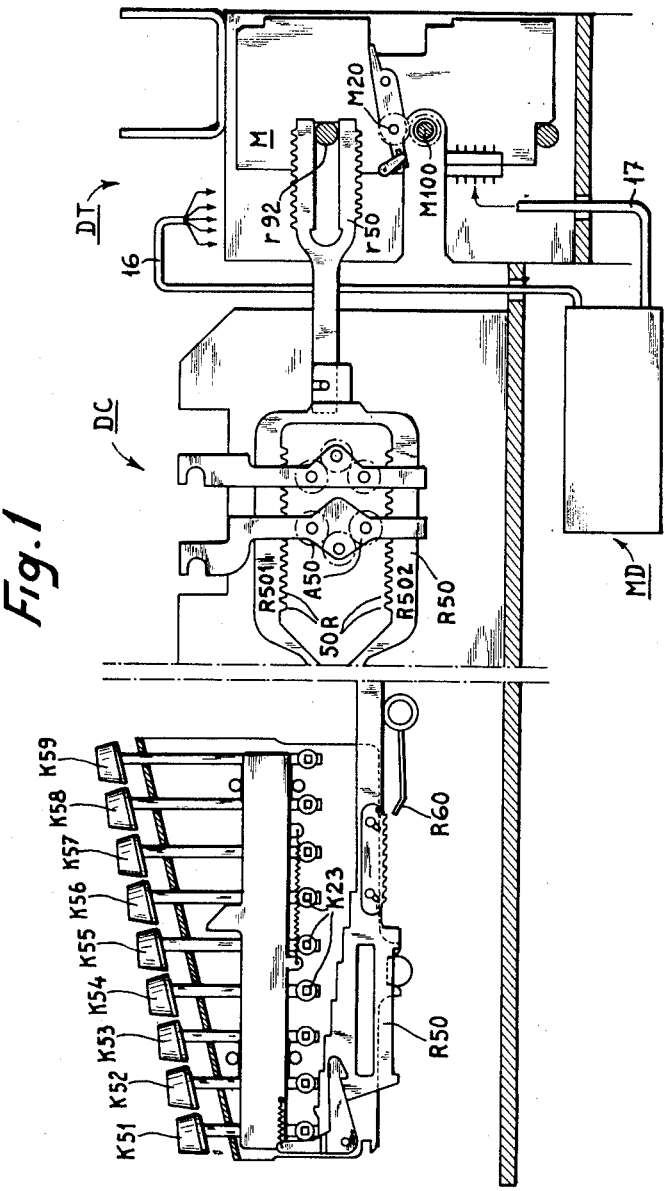

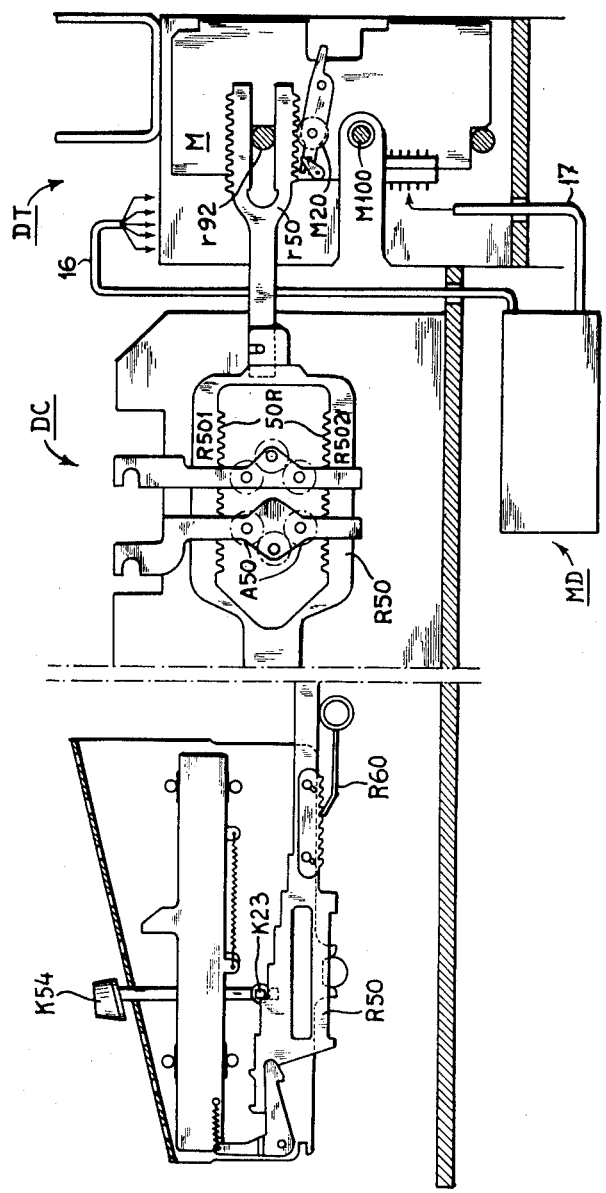

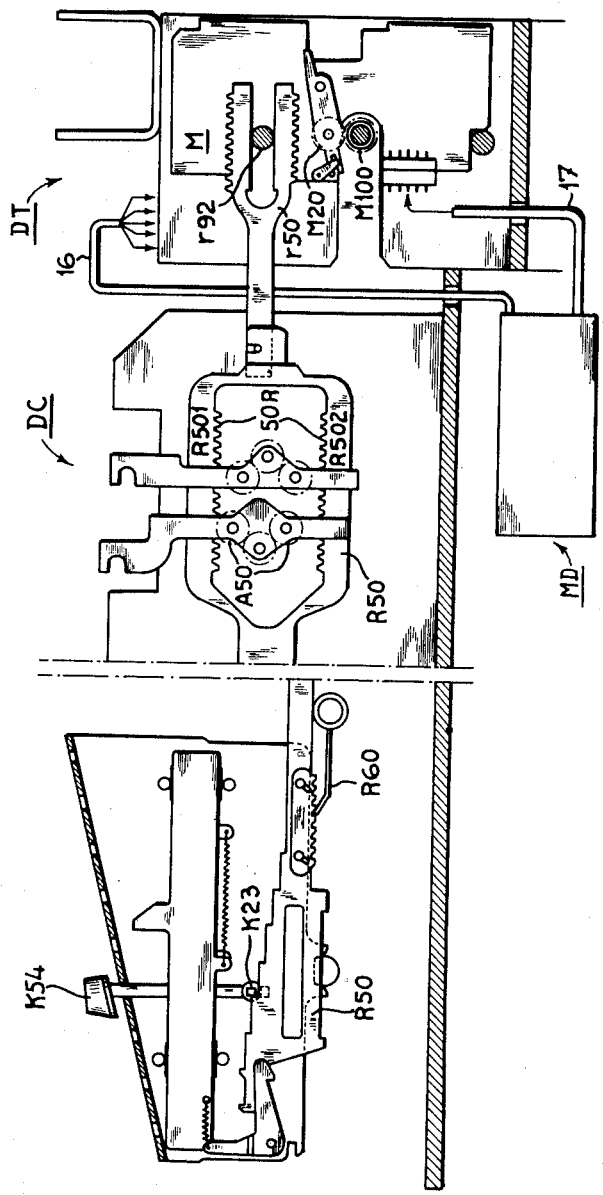

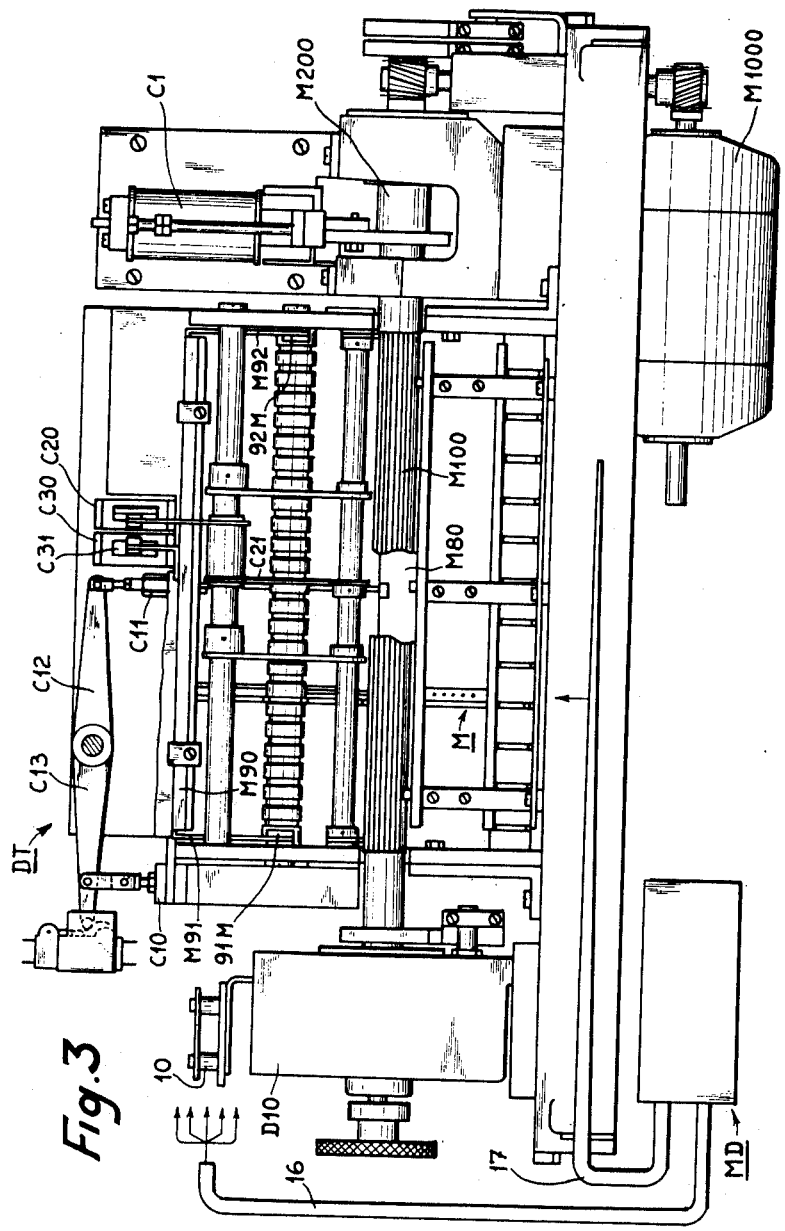

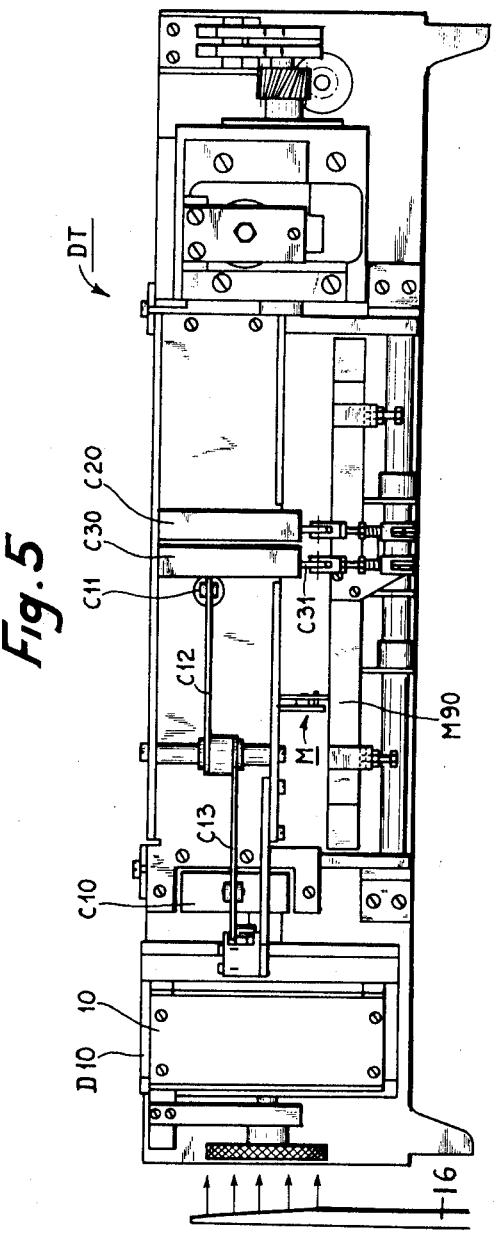

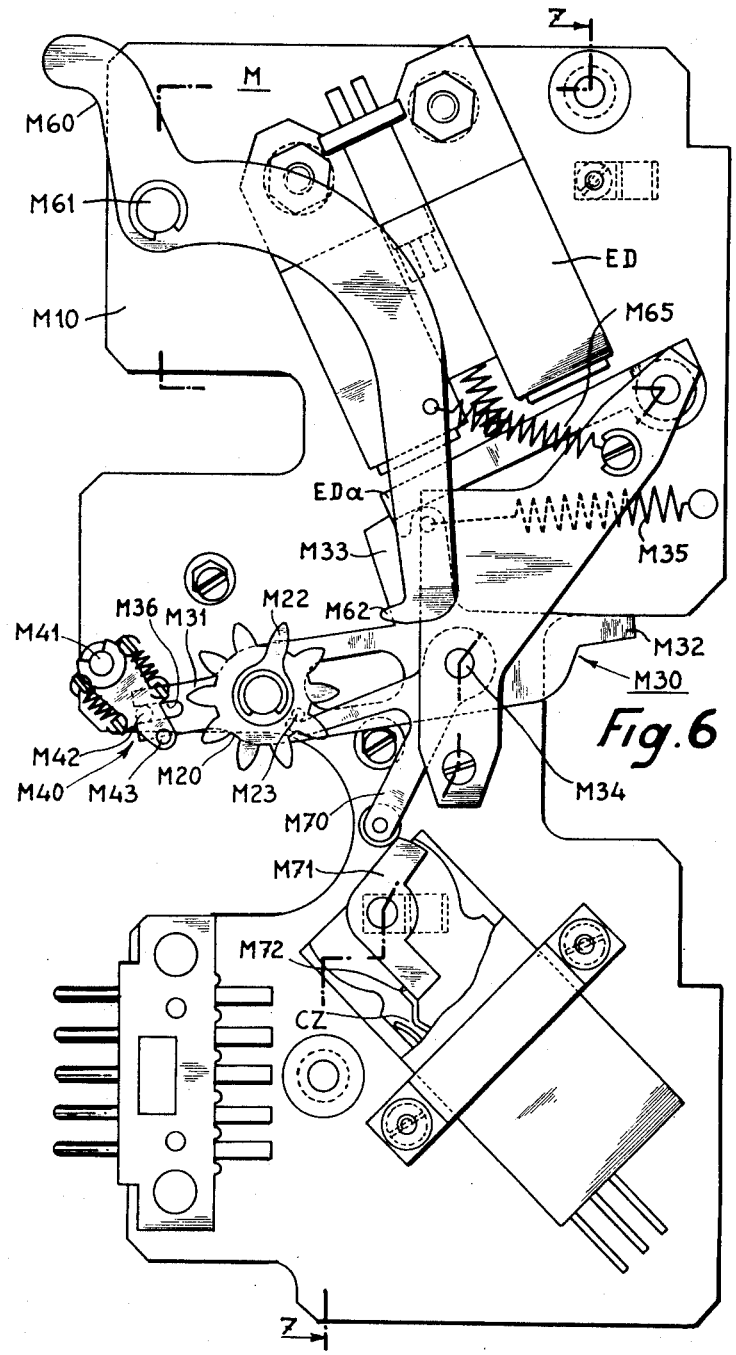

Sept. 14, 1965 L. G. DURAND 3,206,114
ACCOUNTING MACHINE WITH MAGNETIC CORE STORAGE MATRIX
Filed May 1, 1963 15 Sheets-Sheet 8
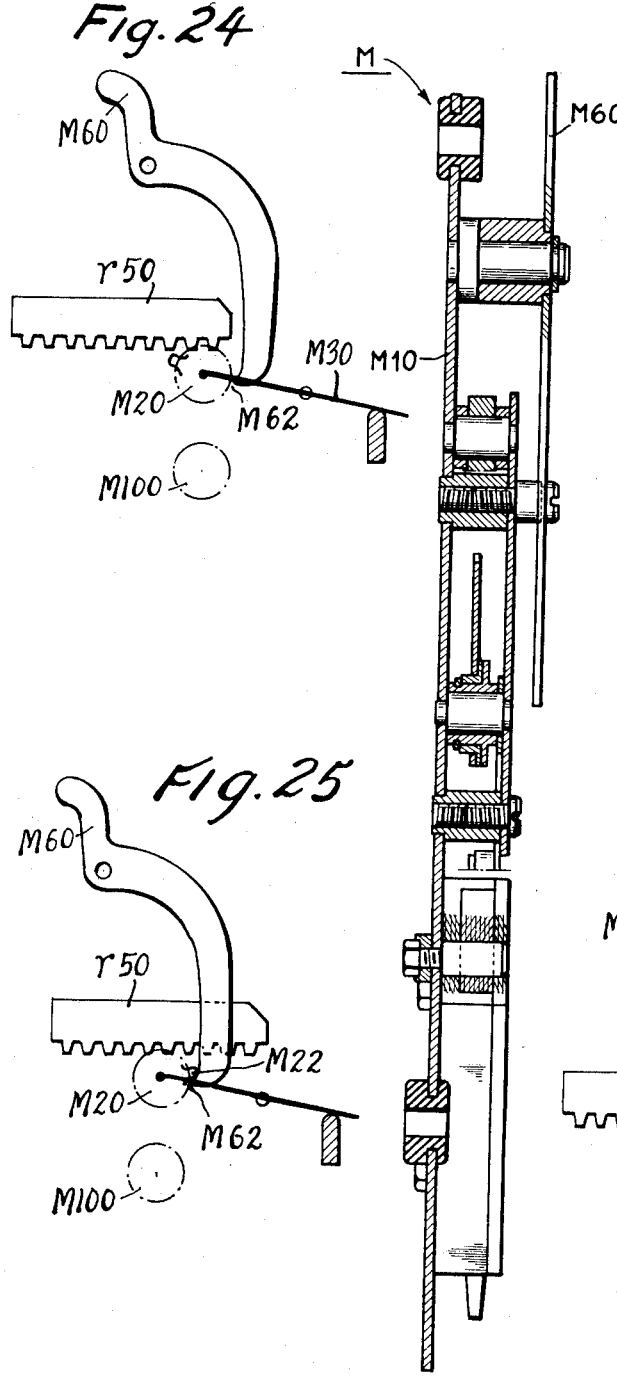
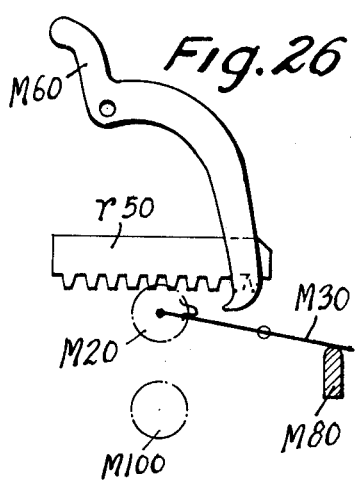
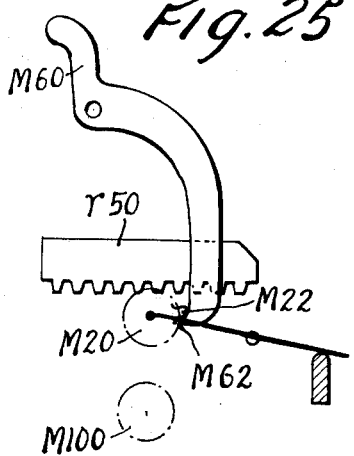
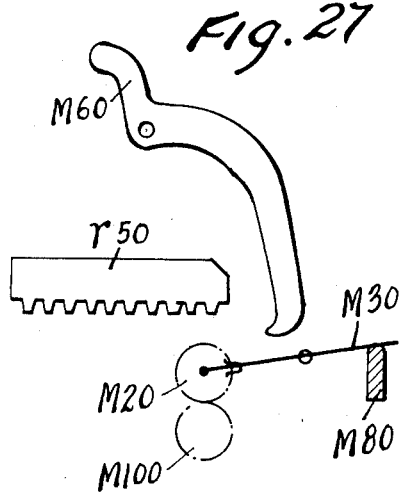

Sept. 14, 1965 L. G. DURAND 3,206,114
ACCOUNTING MACHINE WITH MAGNETIC CORE STORAGE MATRIX
Filed May 1, 1963 15 Sheets-Sheet 10

Sept. 14, 1965  L. G. DURAND  3,206,114
ACCOUNTING MACHINE WITH MAGNETIC CORE STORAGE MATRIX
Filed May 1, 1963  15 Sheets-Sheet 11 though  the  same  will  now  be  described,  by  way  of  example,  with  reference  to  the  accompanying  drawings,  in  which:

United States Patent Office 3,206,114
Patented Sept. 14, 1965

3,206,114
ACCOUNTING MACHINE WITH MAGNETIC CORE STORAGE MATRIX
Lionel Gilbert Durand, Colombes, France, assignor to Compagnie des Machines Bull (Societe Anonyme), Paris, France
Filed May 1, 1963, Ser. No. 277,357
Claims priority, application France, June 18, 1962, 901,070
3 Claims. (Cl. 235—61)

This invention relates to a keyboard accounting machine comprising mechanically controlled accumulators, an electrically controlled datum store and a transfer device for transferring data between the accumulators and the store, as also for introducing into the store data composed on the keyboard of the machine.

This invention is concerned more particularly with a machine of which one part, comprising the keyboard and the accumulators, operates in the same way as the machine described in the patent applied for in the United States of America on December 30, 1908 and granted under No. 1,197,276. This part of the machine will hereinafter be called the accounting device.

In accordance with said patent, the control members of the accumulators of the accounting device are toothed racks.

The datum store of such a machine is intended to perform the function of a buffer memory between devices operating at different speeds for carrying out operations on data respresented in various ways, which is the case, more especially, in the accounting device of the machine and in record card or record tape devices which may be associated with the machine for automatically receiving data therefrom or supplying data thereto.

In accordance with the invention, the datum store is so arranged that the transfers of data between these devices can take place without any necessity to modify the speed of operation of each of them.

A machine according to the invention is distinguished in addition by at least one of the following features:

The transfer device is designed to render the operations performed by the store independent of the operations performed by the accounting device, the transfer device operating successively in combination with the accounting device and with the store;

The transfers of data between the accounting device and the datum store take place in each instance, regardless of the direction of transfer, in two separate successive operations, one of which comprises a transfer of data between the transfer device and the accounting device, while the other of these operations comprises a transfer of data between the transfer device and the store;

The store comprises a magnetic-core storage matrix, of which each column constitutes a register in which there may be registered any digit of the notation system in which the data to be stored are represented;

The store comprises control circuits for introducing a digit into each register and extracting a digit from each register in such manner as to receive data from devices which are connected thereto, more especially from the accounting device of the machine and record-card or record-tape devices associated with the machine, and in such manner as to supply data thereto.

A code-converting device is associated with those devices connected to the store in which the code employed for representing the digits of the data forming the subject of a transfer is different from the code employed in the store.

Figure 4:
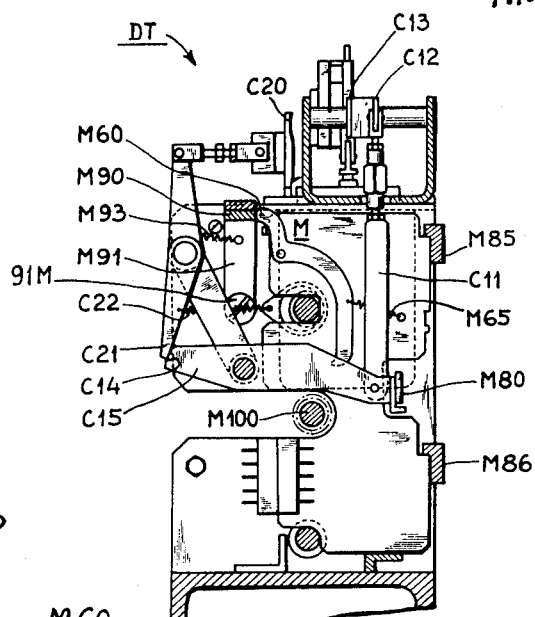
Figure 22:
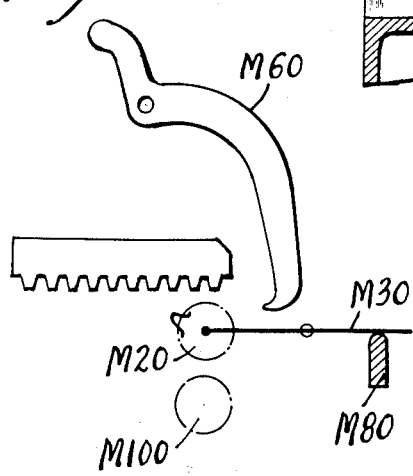
Figure 8:
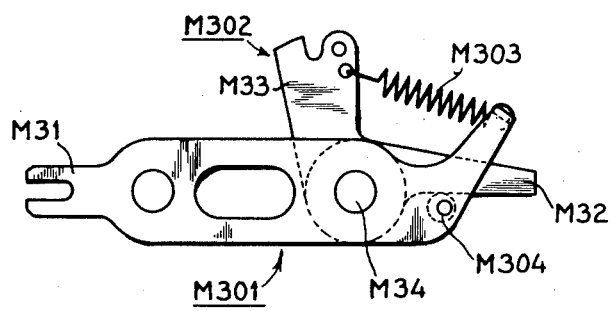
Figure 9:
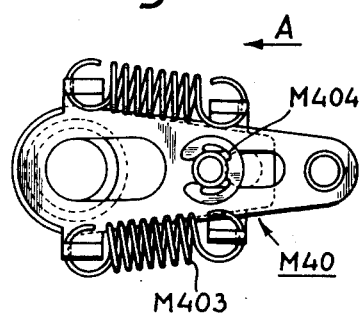
Figure 11:
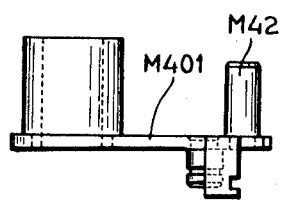
Figure 10:
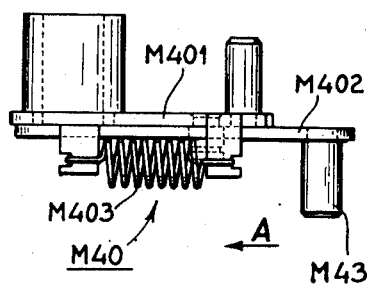
Figure 28:
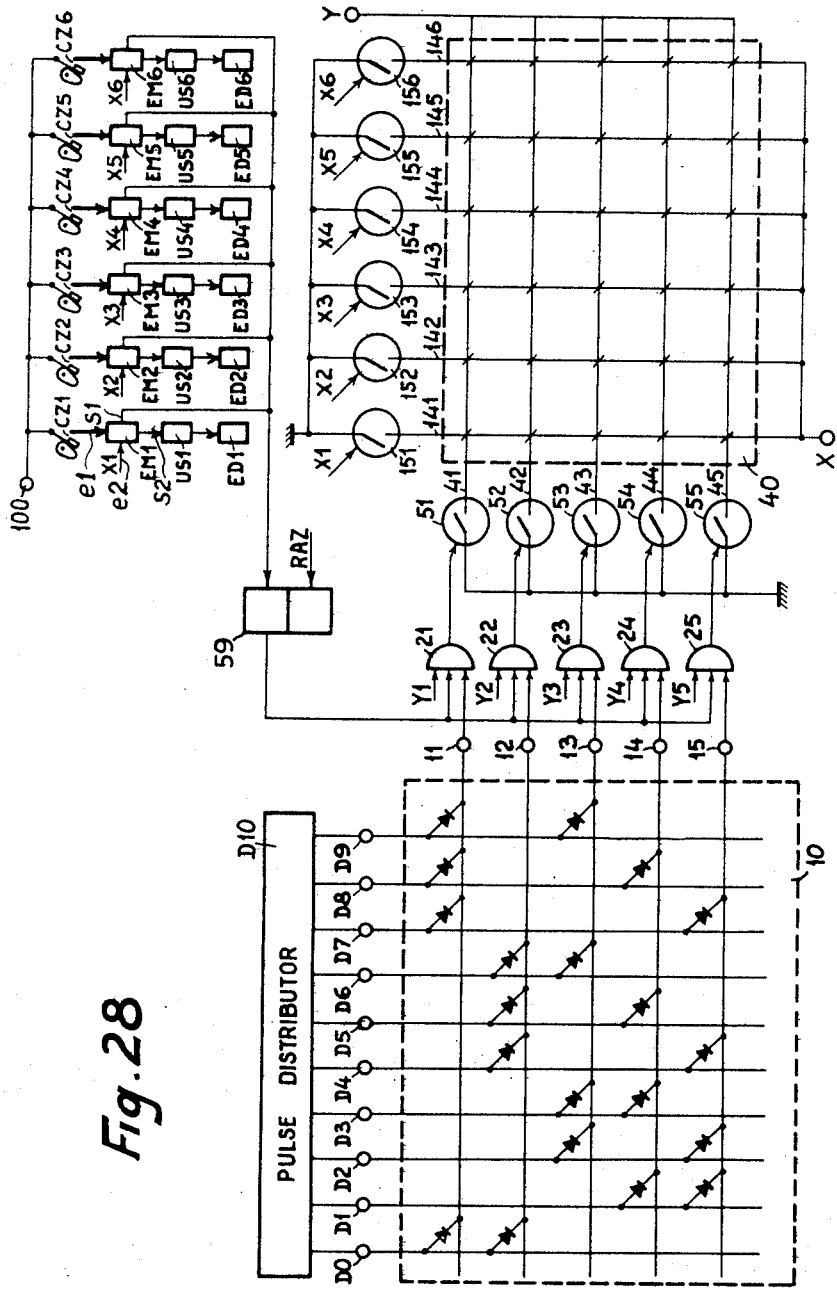
Figure 29:
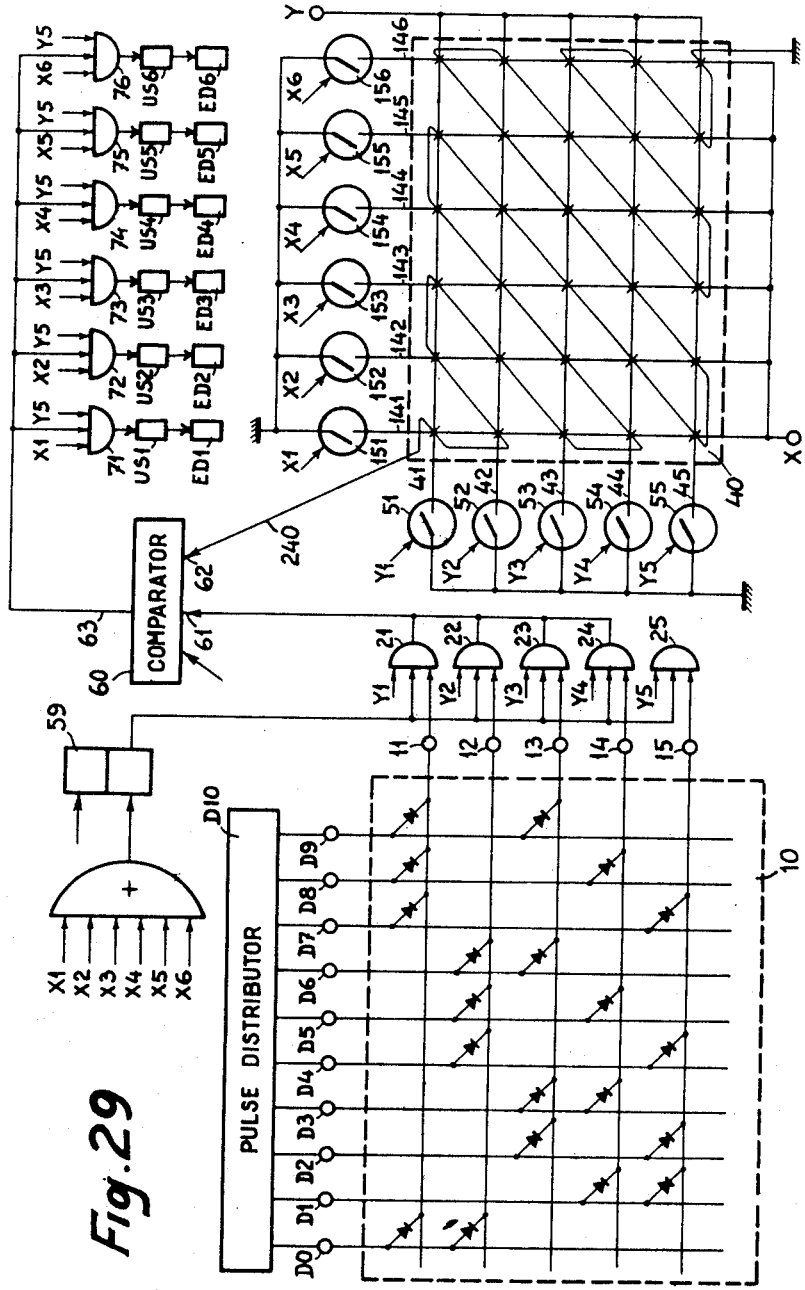
Figure 30:
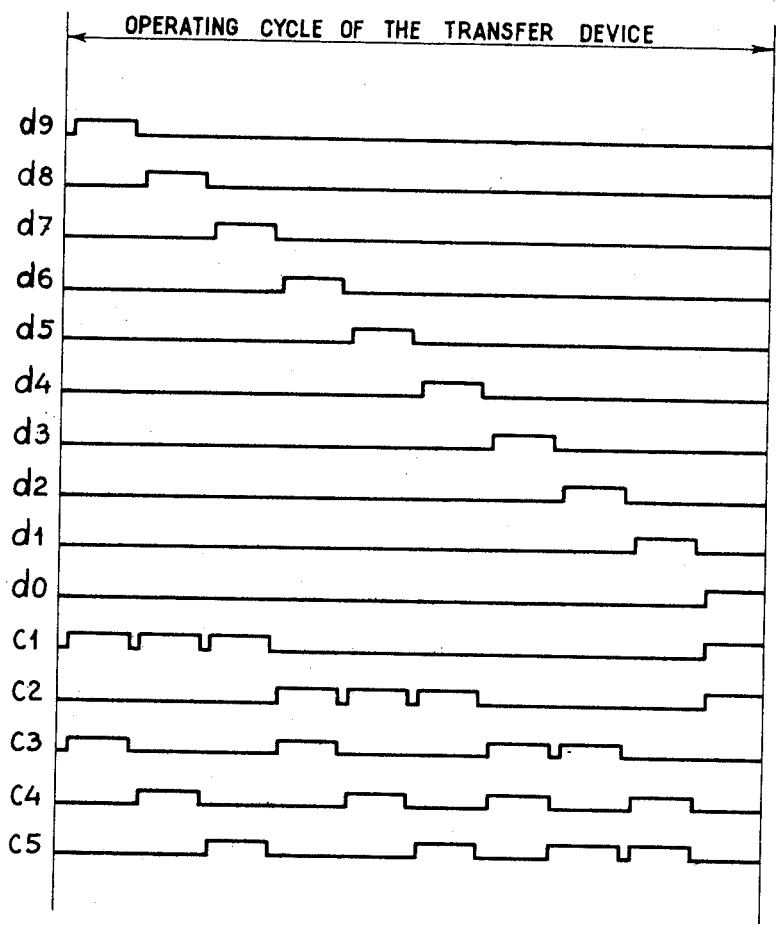
Figure 31:
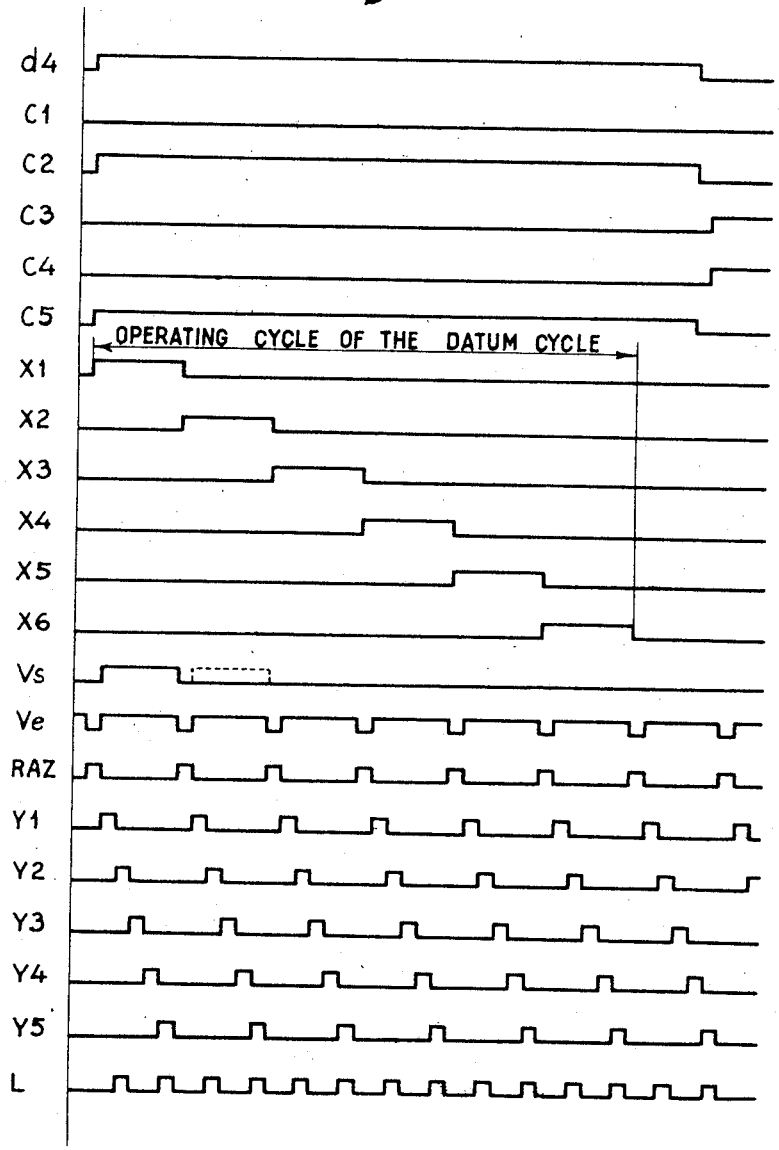

For a better understanding of the invention and to show how it may be carried into effect, the same will now be described, by way of example, with reference to the accompanying drawings, in which:

FIGURE 1 is a vertical longitudinal section through a machine according to an embodiment of the invention, some non-characteristic parts having been omitted in order to simplify the drawing, FIGURES 2a and 2b are sections similar to that of FIGURE 1, in which some mechanisms of the machine have been actuated after one of the keys of the numerical keyboard has been depressed, FIGURE 3 is an elevational view of the rear part of the machine along the line 3—3 of FIGURE 1, FIGURE 4 is a side view along the line 4—4 of FIGURE 3 of the same part of the machine, FIGURE 5 is a view from above of the same part of the machine, FIGURE 6 is a side view of an element of the transfer device, FIGURE 7 is a sectional view of the element shown in FIGURE 6, along the line 7—7 of the latter figure, FIGURE 8 is a view of a detail of a mechanism of the element shown in FIGURE 6, conforming to a modified embodiment of the invention, FIGURES 9 to 12 are views of details of a member shown in FIGURE 6, FIGURES 13 to 27 show diagrammatically the various positions occupied in the course of transfer operations by the members of a transfer element and by the members mechanically connected thereto in the course of these operations, FIGURES 28 and 29 show diagrammatically circuits of the datum store of the machine, and FIGURES 30 and 31 are diagrams illustrating the control signals of the circuits of FIGURES 28 and 29.

FIGURE 1 shows, in their inoperative positions, the main members associated in the machine with a numerical order of the keyboard of an accounting device DC, the notation system employed being the decimal system.

Generally speaking, the operation of the accounting device depends upon the rearward and forward movement of sliding members R50, called toothed racks, which extend from the forward part of the keyboard to accumulator control wheels A50. As is illustrated in FIGURE 1, each rack comprises two series of teeth 50R forming two tooth sets R501 and R502, with which accumulator control wheels A50 are adapted to engage. Each toothed rack R50 is connected through a spring to a driving member (not shown), which carries out in the course of an operating cycle of the accounting device a movement from the front to the rear followed by a movement from the rear to the front in such manner that the rack R50 is first urged rearwards from its inoperative position as illustrated in FIGURE 1, and then returned to this inoperative position.

Means are provided to limit the rearward movement of the rack R50 in accordance with the value which it is to transmit to the recording members connected thereto.

In the case of the introduction of a value by means of the keyboard, this rearward movement is limited by one of the abutments K23 fixed to the vertical slide rods of the keys K51, K52, etc., of the corresponding column of the keyboard.

If the key K54 has been depressed, as shown by way of example in FIGURE 2a, the rack R50 has been moved through four teeth 50R towards the rear when it has come into contact with the abutment K23 of the key K54. If an accumulator control wheel A50 is then brought into engagement with the teeth R501 (FIGURE 2b) and the rack is thereafter returned to the inoperative position illustrated in FIGURE 1, the wheel A50 will have turned through four teeth when the rack has returned to its inoperative position.

It has been recalled in the foregoing how, in a device similar to a known accounting machine, a numerical datum can be introduced by depression of a key of the numerical keyboard. Disposed at the rear of the accounting machine is the transfer device DT of the machine (FIGURES 1 to 5), and connected by cables 16 and 17 to the transfer device DT is a datum store MD (FIGURES 1 to 3.)

Coupled to the rear end of each rack R50 (FIGURE 1) is an auxiliary rack r50 which bears against a crossbar r92 and which slides rearwardly and forwardly simultaneously with the rack R50.

An element M of the transfer device of the machine is associated with each rack r50. Such an element, hereinafter called the transfer element, is disposed along a rack r50 as shown in FIGURES 1, 2a and 2b. As is more clearly shown in FIGURES 6 and 7, it comprises a set of members assembled on a support plate M10. More especially, it comprises a pinion M20 having ten teeth, which is mounted on a lever M30 pivoting about the pin M34. Depending upon the position of the said lever, the pinion M20 can be engaged either with the rack r50 (FIGURE 2a) or with a fluted driving shaft M100 (FIGURE 1). In addition, it can occupy an intermediate position (FIGURE 18), in which it is engaged neither with the rack r50 nor with the fluted shaft M100 and in which a locking member M40 prevents it from turning.

The fluted shaft M100 (FIGURES 3 and 4) with which the pinion of each of the transfer elements can be engaged has on its periphery ten longitudinal flutings with which the teeth of the pinion M20 can engage. It is connected to a motor M1000 through a clutch M200 controlled by an electromagnet C1 and it performs a complete revolution when the electromagnet C1 is energised. It is always driven in the same direction, and its direction of rotation when seen as in FIGURE 4 is in the counter-clockwise direction.

Keyed on the shaft M100 is a pulse distributor D10 (FIGURE 3) which successively emits during one complete rotation of the shaft M100 ten pulses defining respectively ten successive angular positions of the shaft M100 each derived from the preceding one by a rotation through a tenth of a revolution.

One of the teeth of the pinion M20 of the transfer element M (FIGURE 6) is thicker than the others and forms a stud M22 which serves to define, when situated in a predetermined position as indicated in FIGURE 25, a predetermined angular position called the position 0 of the pinion.

The pinion M20 carries a stud M23 intended to close a contact CZ, called the zero contact, when the pinion M20 is in engagement with the fluted shaft M100 and exceeds the angular position indicated in FIGURE 6 while rotating in the clockwise direction. In the course of its rotation in the clockwise direction, the pinion M20 passes through this angular position immediately before reaching the zero position. The stud M23 then pivots in the counter-clockwise direction a lever M70 which pivots in the clockwise direction a lever M71 called the zero contact lever, which shifts to the left a contact spring M72 so as to close the zero contact CZ.

As may be seen from FIGURE 6, the lever on which the pinion M20 is mounted comprises two substantially horizontal arms M31 and M32 and a substantially vertical arm M33, and it is urged in the clockwise direction by a spring M35. In FIGURE 6, the lever M30 is shown in the so-called cocked position, the blade EDa, in the inoperative position, of a disengaging electromagnet ED then being engaged in a recess in the arm M33 of the said lever. The pinion M20 pivotally mounted on the arm M31 of the lever M30 is then engaged with the fluted shaft M100.

When the disengaging electromagnet ED is energised, the blade EDa pivots in the clockwise direction. The arm M33 of the lever M30, urged by the spring M35, turns in the clockwise direction, as also does the lever M30, so that the pinion M20 is disengaged from the fluted shaft M100.

In order to take account of the manufacturing and assembly tolerances of the members taking part in the operation of the transfer element, the above-described lever M30 is replaced by a set of two levers M301 and M302 illustrated in FIGURE 8. The lever M301 comprises an arm M31 carrying the pinion M20 and the lever M302 comprises two arms M32 and M33. The arms of these levers are identical respectively to the arms M31, M32 and M33 of the previously described lever M30. The two levers M301 and M302 pivot about the pin M34 and are connected together by the traction spring M303 which tends to maintain them in abutment in the relative positions indicated in FIGURE 8, the arm M32 of the lever M302 bearing against the adjustable abutment M304 of the lever M301.

The locking member M40 is a member pivoting about the pin M41 and comprises a guide dog M42 which is continuously engaged in a guide slot M36 in the arm M31 of the lever M30. Owing to this connection, when the lever M30 pivots in one direction about its pin M34, the locking member M40 pivots in the opposite direction about its pin M41. The locking member carries a locking finger M43 which becomes inserted between two adjacent teeth of the pinion M20 so as to prevent it from turning when the lever M30 is situated in its intermediate position (FIGURE 18), that is to say, when the pinion M20 is engaged neither with the rack r50 nor with the fluted shaft M100.

Figure 12:
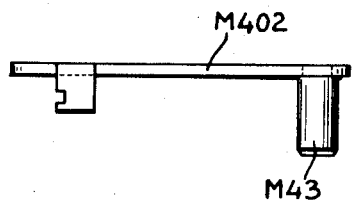

In some stages of operation of the machine, the pinion M20 is in engagement with the fluted shaft M100 and is driven by the latter until the instant when it is disengaged while the shaft continues to rotate. The mode of operation of the machine is such that the disengagement of the pinion M20 can take place at the instant when one of the teeth of the latter is situated in front of the locking finger M43 of the locking member M40. In order that the mechanism may not be subjected to excessive forces, the locking member M40 is designed, in accordance with the invention, as illustrated in FIGURES 9 to 12. Locking member M40 comprises two superposed members M401 and M402 resiliently connected by two springs M403 and maintained in relation to one another by a washer M404 in such manner as to be able to slide in relation to one another in a direction parallel to the direction A. The member M401 carries the guide dog M42 (FIGURE 11) and the member M402 carries the locking finger M43 (FIGURE 12).

As may be seen from FIGURE 6, the support plate M10 of a transfer element carries a lever called the zero abutment lever M60, which is adapted to pivot in the clockwise direction about the pin M61, against the action of the spring M65 so as to take up the position indicated in FIGURE 24, in which the nose M62 of the said lever is situated in the path of the stud M22 of the pinion M20, so as to lock the latter when it passes to the zero position (FIGURE 25).

Figure 23:
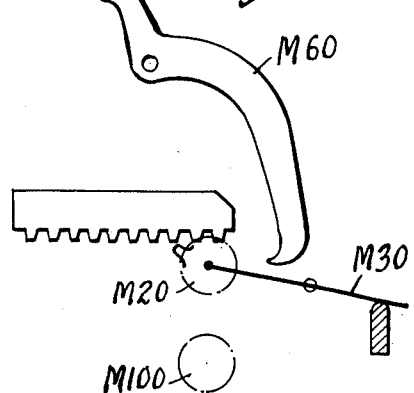
Figure 18:
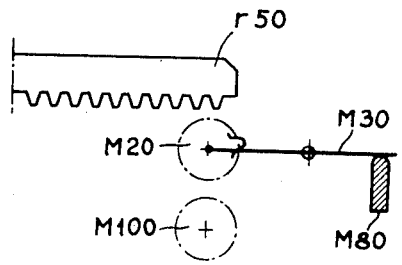
Figure 19:
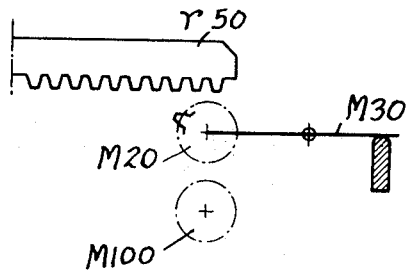

A crossbar M80, called the universal bar (FIGURES 3 and 4), is disposed under the arm M33 of the lever M30 and is adapted, as will hereinafter be seen with reference to the various stages of operation of the machine, to occupy any one of the three positions illustrated in FIGURES 16, 18 and 23.

Disposed along each rack r50 of the machine is a transfer element similar to that hereinbefore described with reference to FIGURES 6 to 12. With reference to FIGURE 4, it will be seen that each transfer element may be readily extracted from the machine after removal of the universal bar M80 and of the crossbars M85 and M86.

Figure 16:
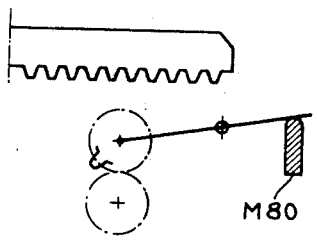

FIGURES 3, 4 and 5 show that the universal bar M80 is connected to the plunger of an electromagnet C10 by the rod C11 and the levers C12 and C13, and that the energisation of the electromagnet C10 has the effect of raising the universal bar M80, so that it is brought to its upper position as indicated in FIGURE 16. The universal bar is urged downwards by a spring (not shown) as soon as the electromagnet C10 is no longer energised, but is is stopped in its central position (FIGURE 17) by a lever C21 (FIGURE 4) which is urged by a spring C22 and becomes engaged in the recess C14 in the lever C15 connected to the universal bar M80.

The lever C21 is controlled by an electromagnet C20 (FIGURES 3 and 5). It pivots in the clockwise direction when the electromagnet C20 is energised, so as to release the lever C15 (FIGURE 4) which, being urged by a spring (not shown), rocks in the clockwise direction. The universal bar M80 then changes to its lower position (FIGURE 23).

FIGURES 4 and 4 show a bar M90 fixed at its ends to the levers M91 and M92 pivotally connected to the pins 91M and 92M. This bar M90 is connected to the plunger C31 of an electromagnet C30. When the latter is energised, the bar M90 is moved parallel to itself towards the rear of the machine (FIGURE 4) against the action of a return spring M93 and pivots in the clockwise direction the zero abutment levers M60 of the transfer elements.

In order to explain the function and operation of the transfer device according to the invention, there will now be described the operations in the course of which information is transferred from the accounting device to the datum store and from the datum store to the accounting device, respectively. It will be sufficient to describe, for each of these operations, the operation of the members associated with one numerical order of the keyboard of the accounting device.

*Transfer of information from the accounting device to the datum store.*—This transfer takes place in two successive separate operations:

An operation in the course of which a transfer of information takes place from the accounting device to the transfer device (this first operation will be called "registering") and an operation in the course of which a transfer of information takes place from the transfer device to the datum store (this second operation will be called "extraction").

Figure 13:
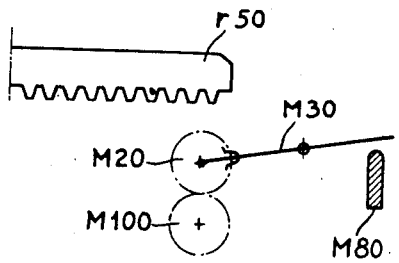
Figure 14:
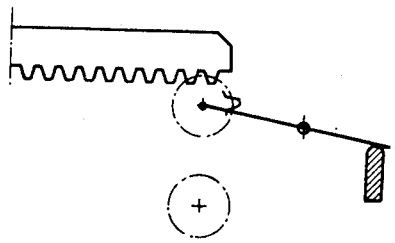
Figure 15:
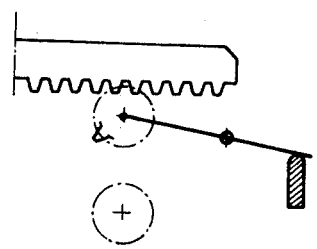

The registering operation takes place at the beginning of the operating cycle of the accounting device. It does not in any way change the course of such a normal operating cycle in the accounting device. Before the commencement of such a cycle, the various members associated with a numerical order of the keyboard of the accounting device are in the position indicated in FIGURE 1. The pinion M20 of the transfer device concerned is then situated in the particular angular position called the zero position (FIGURES 1 and 13).

In order to introduce the digit four, for example, in a numerical order under consideration, the operator depresses the key K54 (FIGURE 2) of this numerical order. He thereafter depresses a key which controls the performance of an operating cycle of the accounting device, in the course of which a device of the machine appropriately distributes energising pulses to electromagnets controlling certain parts of the machine. The disengaging electromagnets of the transfer elements and the electromagnet C20 (FIGURES 3, 4 and 5) controlling the disengagement of the universal bar M80 are energised immediately at the commencement of the operating cycle of the accounting device. The pinion M20 of each transfer element is thus engaged with the rack r50. The various members under consideration are then in the position indicated in FIGURE 14.

During the first part of this cycle, the rack r50 moves through four teeth 50R towards the rear and stops, as shown in FIGURE 2, when the rack R50 has come into contact with the abutment K23 of the key K54. The pinion M20 of the associated transfer element M has then turned through four teeth in the clockwise direction (see also FIGURE 15).

Figure 17:
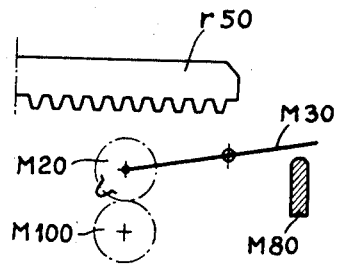

The electromagnet C10 is thereafter energised and the universal bar moves into the uppermost position (FIGURE 16) so as to re-engage the pinion-supporting lever M30 with the blade EDa of the disengaging electromagnet ED of the transfer element, and then immediately returns to its intermediate position (FIGURE 17). The pinion M20 is then in engagement with the fluted shaft M100 and no longer with the rack r50 (FIGURE 16).

The angular position in which the pinion M20 is situated at the end of the registering operation hereinbefore described defines the value four which is to be transferred from the accounting device to the datum store. This value is thus momentarily registered by the transfer element.

The extracting operation, in the course of which the information registered by the transfer device is transferred to the datum store of the machine, may then immediately take place independently of the operations performed by the accounting device, and it may therefore take place either during or after the completion of the cycle at the beginning of which the registering operation has taken place.

The registering operation has been described in the case where the digit transferred from the accounting device to the transfer device is introduced into the machine by means of the keyboard. When the transferred digit is a digit extracted from an accumulator, the wheel of the numerical order under consideration of this accumulator is engaged with the rack at the beginning of the operating cycle of the accounting device. This wheel operates in such manner as to occupy angular positions of decreasing value when the rack is driven towards the rear of the machine and it is held fast when it is situated in the zero position. The rack is thus locked after having been shifted through a number of teeth equal to the value represented by the angular position of the accumulator wheel under consideration at the commencement of the operation. In other respects, the registering operation is identical to that which has previously been described.

The extracting operation commences when the clutch M200 is so controlled that the fluted shaft M100 performs a complete revolution, which corresponds to an operating cycle of the transfer device.

The pinion M20, which was situated in the angular position illustrated in FIGURE 17 at the beginning of the operation, is driven in the clockwise direction by the fluted shaft M100.

Immediately before reaching the zero position, the stud M23 (FIGURE 6) shifts the levers M70 and M71 so as to close the contact CZ. The closing of this contact has the effect, on the one hand, of so controlling the operation of the datum store that that portion of the said store which is associated with the numerical order under consideration registers the value four represented by the pulse emitted by the pulse distributor D10 at this instant, and on the other hand of bringing about the energisation of the disengaging electromagnet ED of the transfer element of which the contact CZ1 has just closed. The wheel M20 of this transfer element is thus disengaged and is situated in the zero position (FIGURE 18) until the end of this operating cycle of the transfer device.

After stoppage of the fluted shaft M100, the electromagnet C10 (FIGURE 3) is energised so that the universal bar is brought to its lower position and all the pinions such as M20 which have been disengaged in the course (and at latest at the end) of the revolution of the fluted shaft are again in engagement with the latter in the zero position (FIGURE 13).

It will be noted that in the course of an extracting operation the pinion of each transfer element concerned, in order to return to the zero position, must turn through a number of teeth equal to the complement to ten of the value represented by its particular angular position at the beginning of this operation. The pulses successively emitted by the pulse distributor D10 in the course of a complete revolution of the shaft M100 therefore represent respectively the values 9, 8, 7, . . . 2, 1, 0 which are the complements to ten of the number of teeth through which the pinion M20 in engagement with the fluted shaft at the instant when these pulses are emitted has turned.

*Transfer of information from the datum store to the accounting machine.*—This transfer takes place in two successive separate operations: an operation in the course of which a transfer of information from the datum store to the transfer device takes place (this first operation will be called "input") and an operation in the course of which a transfer of information from the transfer device to the accounting device takes place (this second operation, which generally leads to the introduction of transferred information into an accumulator, will be called "accumulation").

The input operation takes places place independently of the operations performed by the accounting device. It commences when the clutch M200 is so controlled that the fluted shaft M100 performs a complete revolution, which corresponds to a cycle of operation of the transfer device. At the commencement of this cycle, each pinion M20 is in the zero position, in engagement with the fluted shaft (FIGURE 13).

In the course of the rotation of the fluted shaft M100, the pulse distributor D10 successively emits pulses, each of which represents the complement to ten of the number of teeth through which the fluted shaft has turned at the instant when such a pulse is emitted.

The disengaging electromagnet of the transfer element associated with a decimal order under consideration is energised at the instant when the distributor emits a pulse representing the value registered in that portion of the datum store which is associated with this decimal order. If, for example, the value four is registered in that portion of the datum store which is associated with the decimal order under consideration, the pinion M20 of the transfer element associated with this same decimal order is disengaged after having turned through six teeth, that is to say, through a number of teeth equal to the complement to ten of the value transmitted. It is then in the position indicated in FIGURE 19.

After stoppage of the fluted shaft M100, the electromagnet C10 (FIGURE 3) is energised, so that the universal bar is brought to its upper position and all the pinions M20, which have been disengaged in the course (and at latest at the end) of the revolution of the fluted shaft, are again engaged with the latter (FIGURE 20). The universal bar immediately returns to its central position (FIGURE 21).

Figure 21:
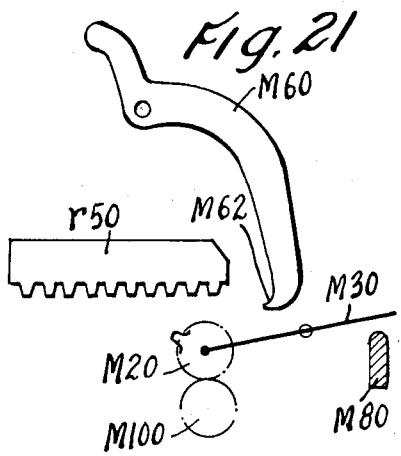

The angular position then adopted by the pinion M20 of the transfer element under consideration represents, as shown in FIGURE 21, the value four which is to be transferred from the datum store to the accounting device. This value is thus temporarily registered by the said transfer element.

The input operation is complete and the accumulating operation takes place at any succeeding instant, during the first part of an operating cycle of the accounting device. The operation of the accounting device in the course of such a cycle is not modified by the performanc of this accumulating operation. Before the commencement of this accumulating operation, the various transfer members associated with the numerical order under consideration are in the position indicated by FIGURE 21. The operator depresses a key which brings about the performance of an operating cycle of the accounting device, in the course of which cycle a device of the machine appropriately distributes energising pulses to electromagnets controlling certain parts of the machine. At the very commencement of this cycle, the electromagnets for disengaging the transfer elements and the electromagnet C20 controlling the disengagement of the universal bar are energised. The universal bar M80 then changes from its central position (FIGURE 22) to its lower position (FIGURE 23) and the pinions M20 of the transfer elements then engage with the corresponding racks, as shown in FIGURE 23. The electromagnet C30 is thereafter energised and maintained energised so as to bring into, and maintain in, the operating position the zero abutment levers (M60) of the transfer elements. The transfer element under consideration has at this instant the appearance diagrammatically illustrated in FIGURE 24.

During the first part of the operating cycle of the accounting device, the racks r50 move towards the rear of the machine while rotating the pinions of the transfer elements. The rearward movement of the rack associated with the transfer element under consideration stops when the pinion M20 of this element has turned through four teeth in the clockwise direction. The pinion M20 is then situated in the zero position, its dog M22 having abutted the nose M62 of the zero abutment lever M60 (FIGURE 25). The rack r50 associated with the transfer element under consideration is thus held fast after a displacement through four teeth in the rearward direction. Any accumulator wheel which is then brought into engagement with the rack will turn through four teeth during the return of the latter to the inoperative position, that is to say, during the second part of the cycle. In the course of the operating cycle of the accounting device, at the end of the rearward movement of the driving member, a transverse bar R60 (FIGURES 1, 2a and 2b) is inserted between two teeth of each of the click members R70 mounted on the racks R50. The electromagnet C30 is then de-energised so that the zero abutment levers M60 urged by their return springs M65 can return to their inoperative position (FIGURE 26). The electromagnet C10 is thereafter energised, so that the universal bar M80 passes to its uppermost position (FIGURE 27) so as to return all the pinions M20 into engagement with the fluted shaft M100. Each transfer element then again appears as illustrated in FIGURE 13. During the second part of the operation of the accounting device, the various members associated with the numerical order of the keyboard are returned to their inoperative position (FIGURE 1). The transfer of information from the datum store to the accounting device is thus complete.

The following description shows how a magnetic-core storage matrix can be used to form the datum store of an accounting machine according to the invention.

However, it is to be understood that other types of datum store may also be used in accordance with the invention.

FIGURES 28 and 29 illustrate the circuits for the control and exploitation of a storage matrix forming the datum store of an accounting machine according to the invention. These figures also show a code-converting device 10 distributing among its five output terminals 11, 12, . . . 15, in accordance with a five-unit code, each of the pulses successively applied by the pulse distributor D10 to the terminals D0–D9, respectively. As indicated in FIGURES 3 and 5, the code-converting device 10 is disposed in the neighbourhood of the pulse distributor D10 and the output terminals 11–15 of the code-converting device 10 are connected to the control circuits of the datum store MD by conductors forming a cable 16 disposed as indicated in FIGURES 1 to 3. The position in time of the pulses $d0$–$d9$ supplied by the pulse distributor D10, and of the pulses $c0$, $c1$, . . . $c5$ set up at the output terminals of the code-converting device 10 in the course of an operation of the transfer device is indicated in FIGURE 30.

The output terminals 11, 12, . . . 15 of the code-converting device are connected to one of the three inputs of the "AND" circuits 21, 22, . . . 25. Pulses Y1, Y2, . . . Y5, of which the position in time in the course of an operating cycle of the datum store is indicated in FIGURE 31, are applied to a second input of the "AND" circuits 21–25, while there is applied to the third input of these circuits a validation voltage $Ve$ or $Vs$ according to the case (FIGURE 31), supplied by a validation trigger circuit 59.

When an extracting operation is to be performed, the output of each of the "AND" circuits 21–25 is connected as shown in FIGURE 28 to a control input of a switch (51–55 respectively) which connects to ground, when closed, one of the ends of one of the line selecting conductors (41–45 respectively) of the matrix 40. The other end of each of these conductors is connected to an appropriate potential source Y. As also shown in FIGURE 28, the control circuits of the storage matrix comprise, for each transfer element M1, M2, . . . M6, a circuit comprising starting from an appropriate voltage source 100, the contact of the transfer element (CZ1 in the case of the transfer element M1, CZ2 in the case of the transfer element M2, etc.) and a storage element (EM1 for M1, EM2, for M2 . . . ). Each of these storage elements is so designed as to assume an operating state when the voltage of the source 100 is applied to its input $e1$, and to supply a control pulse at its outputs $s1$ and $s2$ if it is in its operating state when it receives at its input $e2$ one of the pulses X1, X2, . . . X6 (i.e. X1 for EM1, X2 for EM2, etc.), of which the position in the course of an operating cycle of the datum store is indicated in FIGURE 31.

The output $s1$ of each of the storage elements EM1–EM6 is connected to an input of the validation trigger circuit 59 and any control pulses set up at these outputs $s1$ have the effect of bringing this validation trigger circuit 59 into its operative state, the said trigger circuit then supplying the validation voltage $Vs$.

Return-to-zero pulses RAZ, whose position in time is indicated by FIGURE 31, are applied to an input of this trigger circuit.

The output $s2$ of each of the storage elements EM1–EM6 is connected to the input of a monostable trigger circuit (i.e. US1 for EM1, US2 for EM2, etc.). Such a monostable trigger circuit is capable of supplying an appropriate energising pulse to the disengaging electromagnet (i.e. ED1 for US1, ED2 for US2, etc.) of the corresponding transfer element when it receives a control pulse from the storage element to which it is connected.

The conductors connecting the control circuits of the datum store to the contacts CZ1–CZ6 and to the disengaging electromagnets ED1–ED6 form a cable 17 disposed as indicated in FIGURES 1 to 3 between the datum store MD and the transfer elements M of the transfer device DT of the accounting machine. Switches 151, 152, . . . 156 controlled by the voltages X1, X2, . . . X6 respectively each connect to ground, when closed, one of the ends of one of the column selection conductors (i.e. 141, 142, . . . 146, respectively) of the storage matrix. The other end of each of these conductors is connected to an appropriate potential source X.

When an input operation is to be performed, the switches 51–55 are controlled by the pulses Y1–Y5 respectively as shown in FIGURE 29. The validation trigger circuit 59 is brought into its active state by each of the pulses X1–X6 and supplies a validation voltage $Vc$ (FIGURE 31). In addition, the output of each of the "AND" circuits 21–25 is connected to an input 61 of a comparator 60, of which the other input 62 is connected to the output 240 of the storage matrix and of which the output 63 is connected to one of the inputs of the "AND" circuits 71, 72, . . . 76. Each of these "AND" circuits comprises a second input, to which is applied one of the pulses X1–X6, as indicated in FIGURE 29, and a third input to which is applied the pulse Y5. The output of each of the "AND" circuits 71–76 is connected to the control input of one of the monostable trigger circuits US1–US6 in the manner indicated in FIGURE 29.

In order to explain the operation of the datum store, the so-called input and extraction operations previously described will again be considered. Let M1 be the transfer element involved in these operations, and ED1 and CZ1 the disengaging electromagnet and the zero contact of this element. In the course of each of these operations, the transfer device performs, as indicated, an operating cycle in the course of which the pulse distributor D10 successively supplies to the terminals D9–D0 pulses $d9$–$d0$ respectively, and the code-converting device supplies successively at its output terminals 11–15 pulse combination $c0$–$c5$ according to a code. Each pulse of the distributor initiates an operating cycle of the datum store. The duration of such an operating cycle is shorter than the duration of the pulse which initiates this cycle, as shown in FIGURE 31 in the case of the cycle initiated by the pulse $d4$.

During an operating cycle of the datum store, a member of this store supplies pulses X1, X2, . . . X6, the position of which in time is indicated by FIGURE 31. Each of these pulses defines the time during which the registration or the reading of a datum (i.e. of a digit) takes place in one column of the storage matrix.

During the period of each of the pulses X1–X6, a member of the datum store supplies the pulses Y1, Y2, . . . Y5, the position of which in time is indicated by FIGURE 31. Each of these pulses defines the time during which the registration or reading of a code element occurs on a line of the column selected by one of the pulses X1–X6.

*Extracting operation.*—It will be assumed that the value four stored in the transfer element M1 (see FIGURE 17) is to be transferred to the datum store. In the course of the operating cycle of the transfer device, immediately before the occurrence of the pulse $d4$, the pinion M20 of the transfer element M1 (FIGURE 6) closes its zero contact CZ1 (FIGURE 28), which then applies the potential of the source 100 to the input $e1$ of the storage element EM1. This storage element is thus brought into its active state and supplies a pulse to the monostable trigger circuit US1 and a pulse to the validation trigger circuit 59 as soon as a pulse X1 is applied to its input $e2$. The monostable trigger circuit then supplies an energising pulse to the disengaging electromagnet ED1 of the transfer element M1. The pinion M20 of this transfer element is thus disengaged from the fluted shaft M100 at the instant when it is in the zero position (FIGURE 18). In addition, the switch 151 is closed by the pulse X1, so that during the period of this pulse the column conductor 141 is traversed by a writing control current. During the period of this pulse X1, a pulse $Vs$ is simultaneously applied to an input of each of the "AND" circuits 21–25, the pulses Y1–Y5 which are successively generated are applied respectively to a second input of the same circuits, and finally the pulses $c2$ and $c5$ which are set up at the terminals 12 and 15 respectively are applied to a third input of the "AND" circuits 22 and 25, which supply a control pulse to the control inputs of the switches 52 and 55 respectively. The switches 52 and 55 are closed and the line conductors 42 and 45 are traversed, during the period of the pulses Y2 and Y5 respectively, by a writing control current, while the other line conductors are not, so that only the cores situated on the second line and on the fifth line of the first column of the matrix are brought from the state zero to the state one during the period of the pulse X1, and the value four is thus registered in this column, which corresponds to the transfer element M1 under consideration.

If the value four is also registered in other transfer elements, for example in the transfer element M2, the storage element EM2 is brought into its active state simultaneously with the storage element EM1 and supplies a pulse to the validation trigger circuit 59 immediately the pulse X2 is applied to its input e2. The pulse Vs (represented by broken lines in FIGURE 31) is then applied during the period of the pulse X2 to an input of each of the "AND" circuits 21–25, so that the line conductors 42 and 45 are traversed, during the period of the pulses Y2 and Y5 respectively, by a writing control current, and the other line conductors are not. It follows that the cores situated on the second line and the fifth line of the second column of the storage matrix are brought from the zero state into the state one during the period of the pulse X2 and that the value four is thus registered in this second column, which corresponds to the transfer element M2.

In order to take account of the fact that information can be registered in the datum store before the transfer operation, the reading control circuits of the datum store are controlled at the beginning of each of the pulses Y1–Y5 in such manner as to bring into the zero state the magnetic cores which were in the state one at the beginning of the transfer operation. In addition, the registration control circuits are so arranged that the registering operation taking place in one core, when it occurs, can commence only after the operation of returning this core to zero and not immediately at the commencement of the pulses Y1–Y5 as has been indicated in the foregoing for the sake of simplicity.

*Input operation.*—It will be assumed that the value four which is registered in five-unit code in the first column of the storage matrix is to be transferred to the transfer element M1.

The magnetic core situated on the second and fifth lines of this column are then in a state of residual magnetisation, which is regarded as representing the value one, while the other cores of this column are in a state of residual magnetisation which is regarded as presenting the value zero. In addition, the pinion M20 of the transfer element M1 is in the zero position (FIGURE 13).

The transfer device performs, as has been stated, an operating cycle. Each pulse of the distributor D10 initiates an operating cycle of the datum store, in the course of which the pulses X1, X2, . . . X6 are successively emitted. During the period of each of the pulses X1–X6, the pulse Vc is applied to an input of each of the "AND" circuits 21–25, while the pulses Y1–Y5 which are successively set up are applied respectively to a second input of the "AND" circuits 21–25, so that one of the pulses c1–c5 applied to the third input of these "AND" circuits during the period of each pulse of the distributor determines the occurrence in series, at the output of these "AND" circuits, of pulses which are thus successively applied to the input 61 of the comparator 60.

During the period of the pulse X1 emitted in the course of the operating cycle initiated by the pulse d4, the switch 151 closes and the switches 51–55, controlled by the pulses Y1–Y5 respectively, successively close, so that the magnetic cores through which the column conductor 141 extends successively receive the control currents capable of returning them from the state one to the zero state. The cores situated on the lines 42 and 45 are thus returned from the state one to the state zero at the instant when the pulses Y2 and Y5 respectively are emitted.

The reading conductor 240 of the matrix then transmits to the input 62 of the comparator 60 corresponding reading pulses L (FIGURE 31). These pulses coincide with the pulses applied to the input 61 of this comparator by the "AND" circuits 21–25. The coincidence of the pulses applied to the inputs of the comparator are translated by the occurrence of a voltage of predetermined value at the output 63 of this comparator. This voltage is applied to one of the inputs of an "AND" circuit 71 having two other inputs, to which the pulses X1 and Y5 respectively are applied. In the example under consideration, at the instant when the pulse Y5 occurs, the logical condition that the "AND" circuit 71 is to detect is brought about, so that this circuit supplies a control pulse to the monostable trigger circuit US1, which then supplies an energising current to the clutch electrogmagnet ED1 of the transfer element M1. The pinion M20 of this element is thus disengaged from the fluted shaft after having rotated, in accordance with the described mode of operation, through a number of teeth equal to the complement to ten of the value four which is to be transferred from the datum store to the accounting device by the transfer elements M1 under consideration. The value four is then registered in this transfer element.

It has been seen that in the course of each of the operating cycles of the store, owing to the application of the series of pulses X1–X6 and of the series of pulses Y1–Y5 to the control circuits of the storage matrix, the various registers of the latter are successively brought into the operative state, so that in the course of each of these cycles a digit can be transferred between each of these registers and data-processing devices connected to the store and designed to receive data from the latter or to transfer data thereto.

A store of the type under consideration may function at the rate of several hundred cycles per second. The devices connected thereto generally operate at a much slower rate. More especially, record-card or record-tape devices which are to be connected to this store scarcely register or read more than 30 digits per second. In order to arrange the transfers of information at the rate of operation of these devices, it is proposed in accordance with one of the embodiments of the invention to effect the transfer of only one digit at each operating cycle of the store and to interrupt the opertion of the store between each two cycles.

If the code employed in one of these devices is the same as that employed in the store, it is possible to carry out separately the transfer of each code element, and if the reading or registering speed of the code elements in such a device is lower than the reading or registering speed of the code elements in the store (which is generally the case), the transfer can be so arranged that in the course of each operating cycle of the store the latter ceases to operate after the transfer of each code element until the instant when the connected device is in a condition to participate in the transfer of the succeeding code element.

I claim:

1. In a keyboard controlled accounting machine comprising mechanically controlled totalizers, cyclically operating control members for mechanically controlling said totalizers, said control members being adapted, during a first part of a machine cycle, selectively to store data introduced in the machine by means of the keyboard or data read out from any selected one of said totalizers, and, during a second part of the same machine cycle, to transfer such data to selected ones of said totalizers, a combination for the transfer of data in either direction between said accounting machine and data processing devices electrically connected thereto, said combination comprising a magnetic core storage matrix and a transfer device having storing members arranged to be set differentially into different data representing positions, controllable means for performing transfers of data in either direction between said storing members and said control members during the first part of any chosen machine cycle, and controllable means for performing transfers of data in either direction between said storing members and said storage matrix irrespective of the machine cycle except during transfer of data between said storing members and said control members.

2. In a keyboard controlled accounting machine comprising cyclically operating control members each adapted to travel through a plurality of data representing positions, one of which is a reset position, means for yieldingly driving each of said control members from its reset position to its different data representing positions successively during a first part of each machine cycle, means for positively stopping any selected one of said control members in any selected one of its data representing positions, while said control members are being so driven, so as to cause such a selected control member to store the data represented by such a selected position, and means for positively returning said control members to their reset positions during a second part of each machine cycle, the combination comprising: a magnetic core storage matrix having a number of registers each corresponding to a different one of said control members and each responsive to coincident application of an electrical control signal and of an electrical code signal representative of data for storing such data, and a transfer device selectively connectible either to said storage matrix or to said control members for performing transfer of data in either direction between said storage matrix and said control members, said transfer device comprising mechanically operating data storing members each associated with a different one of said control members and with the corresponding one of said registers and each adapted to travel through a plurality of different data representing positions, the number of which is equal to the number of the data representing positions of the control members, one of said positions being a reset position, said transfer device further comprising a cyclically driving means which, during a drive cycle, successively takes up a plurality of different positions respectively representing the different data which can be transferred by each of said storing members, means coupled to said driving means for providing first electrical code signals each representative of the data which the present position of said driving means represents, means for coupling each of said storing members to its associated control member during the first part of a machine cycle so that each storing member and its associated control member may be yieldingly driven through the same number of data representing positions during the first part of such a machine cycle, abutment means adapted, when the storing members are coupled to their respective control members, to stop each of said storing members in its reset position, means for engaging each of said storing members with said driving means at the beginning of a drive cycle, so that each storing member, as long as it is so engaged, may be driven through the same number of data representing positions as the driving means, a series of disengaging means each carrying a different one of said storing members and adapted, when operated, to set the storing member carried thereby in a position where it engages neither the respective control member nor the driving means and simultaneously to block said carried storing member against travel, means for supply said first code signals to the several registers during a drive cycle, a series of means each associated with a different one of said storing members and adapted to supply an electrical control signal to the corresponding register and to operate the disengaging means of the respective storing member when this storing member travels through its reset position, matrix read-out means for providing a series of second electrical code signals each representative of the data stored in a different one of said registers each time one of said first code signals is provided and means for operating the disengaging means carrying a storing member when the second code signal representative of the data stored in the corresponding register is identical to the then provided first code signal.

3. In a keyboard controlled accounting machine comprising cyclically operating control members each adapted to travel through a plurality of data representing positions, one of which is a reset position, means for yieldingly driving each of said control members from its reset position to its different data representing positions successively during a first part of each machine cycle, means for positively stopping any selected one of said control members in any selected one of its data representing positions, while said control members are being so driven, so as to cause such a selected control member to store the data represented by such a selected position, and means for positively returning said control members to their reset positions during a second part of each machine cycle, the combination comprising:

a magnetic core storage matrix having magnetic cores arranged in lines and columns with each column assigned to a different one of said control members of the accounting machine and with each line assigned to a different element of the code used in the storage matrix to represent the different possible data to be transferred between a control member and the assigned column, and a transfer device for transferring data in either direction between any of the control members of the accounting machine and the respectively assigned column of the storage matrix, said transfer device comprising:

a plurality of toothed-racks each rigidly secured to a different one of the control members of the accounting machine, a driving means including a fluted shaft and adapted, when set in operation, to drive said shaft through one complete revolution, said shaft, during each complete revolution, successively assuming a number of different angular positions each representative of a different one of the several possible data to be transferred, a combination-code pulse generator synchronized with the rotation of said shaft, having a multiple terminal output and being adapted to provide at its output a combination of pulses representing, according to the code used in the storage matrix, the value which the present angular position of the shaft is representative of, a plurality of transfer elements each of which is associated to a different one of said control members of the accounting machine and comprises:

a storage toothed wheel having a number of data representing angular positions equal to the number of different possible data to be transferred, one of these angular positions being a reset position, an operation control means capable of assuming either a first, a second or a third state and adapted to throw into gear said toothed wheel either with the toothed rack secured to the corresponding control member or with said shaft, or else to disconnect said toothed wheel both from the toothed rack secured to the corresponding control member and from said shaft while simultaneously blocking it against rotation, according to whether it assumes its first, its second or its third state.

abutment means adapted, when set in operation while the operation control means assumes its first state, to stop the toothed wheel in its reset position.

first means adapted, when set in operation while the operation control means assumes its second state and upon the toothed wheel reaching its reset position, to set this operation control means in its third state and simultaneously to write the code combination then provided by the generator in the corresponding column of the storage matrix, and second means adapted, when set in operation while the operation control means assumes its second state and upon reading out from the corresponding column of the storage matrix the same code combination as the one then provided by the generator, to set that operation control means in its third state.

References Cited by the Examiner
UNITED STATES PATENTS

| | | | |
|---|---|---|---|
| 3,009,633 | 11/61 | Dilks | 235—61 |
| 3,050,246 | 8/62 | Gorner | 235—61 |
| 3,059,845 | 10/62 | Breitling | 235—61 |
| 3,066,866 | 12/62 | Kittel | 235—61 |

LEO SMILOW, *Primary Examiner.*